(12) United States Patent
Buschmann et al.

(10) Patent No.: US 10,087,588 B2
(45) Date of Patent: Oct. 2, 2018

(54) ROAD FINISHING MACHINE WITH LATERAL OPERATION UNIT

(71) Applicant: JOSEPH VOEGELE AG, Ludwigshafen/Rhein (DE)

(72) Inventors: Martin Buschmann, Neustadt (DE); Achim Eul, Mannheim (DE); Klaus Oettinger, Altlussheim (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 15/449,075

(22) Filed: Mar. 3, 2017

(65) Prior Publication Data

US 2017/0254031 A1 Sep. 7, 2017

(30) Foreign Application Priority Data

Mar. 4, 2016 (EP) ..................................... 16158709

(51) Int. Cl.
*E01C 19/48* (2006.01)
*B60Q 3/40* (2017.01)
(Continued)

(52) U.S. Cl.
CPC ............ *E01C 19/4873* (2013.01); *B60Q 1/02* (2013.01); *B60Q 3/40* (2017.02); *E01C 19/48* (2013.01);
(Continued)

(58) Field of Classification Search
CPC .......... E01C 23/07; E01C 23/01; E01C 19/42; E01C 19/4873; E01C 19/22; E01C 19/48;
(Continued)

(56) References Cited

U.S. PATENT DOCUMENTS 5,442,527 A * 8/1995 Wichelt .................. B60Q 1/14
   315/83
6,668,253 B1 * 12/2003 Thompson ............. G06Q 10/06
   (Continued)

FOREIGN PATENT DOCUMENTS

DE   9204599 U1   5/1992
DE   29609704 U1  8/1996
(Continued)

OTHER PUBLICATIONS

European Search Report dated Aug. 22, 2016, Application No. EP 16158709.2-1604, Applicant Joseph Voegele AG, 6 Pages.
(Continued)

*Primary Examiner* — Abigail A Risic
(74) *Attorney, Agent, or Firm* — Brooks Kushman P.C.

(57) ABSTRACT

A road finishing machine includes a chassis, a material bunker for receiving paving material located at the front in the paving direction of the road finishing machine, and a screed for compacting paving material located at the rear in the paving direction of the road finishing machine. On a driver stand of the road finishing machine, a main control platform with primary operational controls is provided for controlling working components of the road finishing machine. The primary operational controls may be actuated by an operator located on the road finishing machine. An operation unit with a plurality of secondary operational controls is provided laterally at the chassis or the material bunker.

20 Claims, 3 Drawing Sheets

(51) Int. Cl.
*B60Q 1/02* (2006.01)
*G07C 5/08* (2006.01)

(52) U.S. Cl.
CPC ......... *G07C 5/0808* (2013.01); *G07C 5/0841* (2013.01); *E01C 2301/30* (2013.01); *E01C 2301/40* (2013.01)

(58) Field of Classification Search
CPC .... E01C 19/405; E01C 19/4833; E01C 21/00; E01C 21/08; E01C 2301/20; E01C 2301/00; E01C 2301/14; E01C 2301/40; E01C 2301/30; E01C 2301/02; E01C 2301/10
See application file for complete search history.

(56) References Cited

U.S. PATENT DOCUMENTS

| | | |
|---|---|---|
| 7,172,363 B2 | 2/2007 | Olson et al. |
| 8,025,459 B2 | 9/2011 | Buschmann et al. |
| 9,394,653 B2 | 7/2016 | Rutz et al. |
| 9,534,349 B2 * | 1/2017 | Horn ........................ E01C 23/01 |
| 2006/0045620 A1 * | 3/2006 | Olson ................... E01C 19/006 404/84.1 |
| 2007/0044088 A1 * | 2/2007 | Eul ........................ E01C 19/48 717/174 |
| 2014/0104056 A1 * | 4/2014 | Ramos ..................... B60Q 1/46 340/471 |
| 2014/0119826 A1 | 5/2014 | Graham et al. |
| 2014/0133906 A1 * | 5/2014 | Frelich .................... E01C 19/48 404/75 |
| 2014/0258928 A1 * | 9/2014 | Brush ................... G06F 3/0482 715/810 |
| 2015/0063907 A1 * | 3/2015 | Graham ................... E01C 23/07 404/84.1 |
| 2015/0361627 A1 * | 12/2015 | Frelich ................ E01C 19/4853 180/65.245 |
| 2016/0101722 A1 * | 4/2016 | Kopca ..................... B60Q 1/24 362/543 |
| 2017/0002525 A1 * | 1/2017 | Horn ....................... E01C 23/01 |

FOREIGN PATENT DOCUMENTS

| | | |
|---|---|---|
| DE | 102005040326 A1 | 4/2006 |
| EP | 2119831 A1 | 11/2009 |
| JP | H5-61211 U | 8/1993 |
| JP | H6-45446 Y2 | 11/1994 |
| JP | H7-331610 A | 12/1995 |
| JP | H10-280477 A | 10/1998 |
| JP | 2014-206044 A | 10/2014 |

OTHER PUBLICATIONS

Japanese Office Action dated Jun. 6, 2018, Application No. 2017-035059, 4 Pages.

* cited by examiner

ROAD FINISHING MACHINE WITH LATERAL OPERATION UNIT

CROSS-REFERENCE TO RELATED APPLICATIONS

This application claims foreign priority benefits under 35 U.S.C. § 119(a)-(d) to European patent application number EP 16 158 709.2, filed Mar. 4, 2016, which is incorporated by reference in its entirety.

TECHNICAL FIELD

The present disclosure relates to a road finishing machine for laying a roadway pavement.

BACKGROUND

Known road finishing machines typically comprise a material bunker located at the front in the paving direction of the road finishing machine for receiving paving material, in particular bituminous paving material. The road finishing machine comprises, at the rear in the direction of travel, a screed suspended at tow bars for compacting and finishing the fresh roadway pavement. For compacting, the screed may comprise a compactor bar (tamper bar) with an adjustable vibration frequency and adjustable lift. For finishing the roadway pavement, a screed plate may be attached to the screed. The properties and quality of the laid roadway pavement depend on a number of settings of working components of the road finishing machine, such as the tamper frequency, the tamper lift and the set angle of the screed. In known road finishing machines, an operator is located in a driver stand provided on the road finishing machine during paving. There is provided a main control platform with operational controls for controlling the working components of the road finishing machine. The driving function of the road finishing machine and coordinated functions, such as a lighting of the road finishing machine, also may be controlled from the driver stand. For the operator to have an optimal overview over the current operating situation during paving, the driver stand with the main control platform is usually provided at an elevated position of the chassis. In particular, the driver stand may be provided centrically at the road finishing machine.

Despite the generally good visual position on the driver stand, the operator might not recognize persons located in front of the road finishing machine. Therefore, it is known from practice to provide a so-called TI (Traction Isolation) switch laterally at the road finishing machine. A person who intends to enter a region located in front of the road finishing machine for performing work may actuate the TI switch whereupon continuation of the road finishing machine is prohibited. When the person leaves the dangerous area in front of the road finishing machine, he or she may reactivate the driving function of the road finishing machine by actuating the TI switch again, so that paving may be continued.

SUMMARY

It is an object of the present disclosure to improve a road finishing machine with respect to its ergonomic properties and its working safety.

A road finishing machine according to the disclosure comprises a chassis, a material bunker for receiving paving material located at the front in the paving direction, and a screed for compacting the paving material located at the rear in the paving direction. The road finishing machine moreover comprises a driver stand which may in particular provide a working place for an operator. The driver stand may be arranged at a central and/or elevated position at the road finishing machine, in particular at the chassis. To protect the operator from weather influences, the driver stand may comprise a roof. Moreover, the driver stand may comprise a railing to prevent the operator from falling off the driver stand. For controlling working components of the road finishing machine, for example for setting the tamper lift, the set angle of the screed, or the height or rotational speed of a spreading auger, a main control platform with primary operational controls is arranged on the driver stand. These primary operational controls are operable by an operator located on the road finishing machine, in particular on the driver stand.

According to the disclosure, the road finishing machine moreover comprises an operation unit provided laterally (with respect to the paving direction) at the chassis or the material bunker. The operation unit may be attached directly at the chassis or the material bunker. However, this is not imperative. For example, the operation unit may also be attached to a side covering of the road finishing machine which is fixed to the chassis. However, it is important to provide the operation unit laterally at the road finishing machine. The operation unit comprises, according to the disclosure, a plurality of secondary operational controls, i.e., at least two secondary operational controls. The secondary operational controls may be, for example, input elements, such as a switch, a key, a touchscreen, a card reader, or the like. The secondary operational controls, however, may also be other elements that permit an interaction with the road finishing machine, in particular with a control system of the road finishing machine. For example, the secondary operational controls may be interfaces for data exchange with the road finishing machine. Advantageously, the secondary operational controls are arranged such that they may be operated by an operator standing next to the road finishing machine.

Since the secondary operational controls are provided laterally at the road finishing machine, they may be operated without having to enter the road finishing machine. This may essentially facilitate the operating sequence on a construction site because an operator does not have to climb onto the driver stand of the road finishing machine just for actuating an operating element in order to perform certain works. This is in particular useful during a current paving operation as it is difficult and may be dangerous to enter and leave the driver stand in this case. Also for performing certain works for which an activation of the primary power plant (e.g., diesel engine) of the road finishing machine is not necessary, it may be advantageous not having to enter the driver stand just for this.

Below, some concrete, particularly advantageous examples of secondary operational controls will be illustrated. These may be provided at the operation unit in any combination (with each other, but also with secondary operational controls not specified more in detail).

The plurality of secondary operational controls may comprise an operational lighting control which may be actuated for switching on and/or switching off at least part of a lighting of the road finishing machine. An operator may now switch on the part of the lighting from the outside already before she or he enters the driver stand. Thus, climbing onto the driver stand is facilitated and rendered more safe in particular in darkness. Also if the state of the road finishing machine or its surrounding area is to be inspected only briefly, by means of the operational lighting control, the part of the lighting may be switched on and off from outside, so that the driver stand does not have to be entered at all for doing so. Depending on the preferred application, the operational lighting control may be configured to switch on and/or off a part of the lighting of the road finishing machine or its complete lighting.

If the lighting of the road finishing machine comprises several lighting elements, a configuration device may be provided by means of which one may control which lighting elements may be switched on and/or off by actuating the operational lighting control. Thus, the operational lighting control may be adapted to the preferences of a certain user or the specified requirements of a certain construction site.

For example, the lighting of the road finishing machine may comprise a work lighting for illuminating the surrounding area of the road finishing machine, in particular a foundation to be provided with a road surface by the road finishing machine, a driver stand lighting provided inside or outside the driver stand for illuminating the driver stand, and/or an access lighting for illuminating an access area to the driver stand.

The switch-off function of the operational lighting control permits an operator to leave the driver stand with the lighting switched on and to only deactivate the lighting from outside by actuating the operational lighting control. Advantageously, the part of the lighting is configured to go out only after a predetermined period of time has lapsed after the operational lighting control has been actuated for switching off the part of the lighting. Thus, the operator gets some time after having switched off the lighting to safely leave the road finishing machine with the aid of the lighting. The predetermined period of time may be, for example, at least 10 seconds, at least 20 seconds, at least 30 seconds or more than 60 seconds, and/or it may be adjustable.

Preferably, the operational lighting control is configured to switch on and off the part of the lighting. This may be realized, for example, such that, when the part of the lighting is switched off, an actuation of the operational lighting control switches on the latter. When the part of the lighting is switched on, a (re-) actuation of the operational lighting control may switch off the latter. However, it would also be conceivable that the part of the lighting may only be switched on or off by means of the operational lighting control.

As an alternative or in addition, the plurality of secondary operational controls may comprise an interface for electronic data exchange with the road finishing machine. This data exchange may be unidirectional or bidirectional.

Such an interface may permit data exchange with the road finishing machine via wireless communication, in particular via wireless communication based on the Near Field Communication (NFC) standard or Bluetooth. It is particularly advantageous for the interface to be designed for receiving RFID (Radio Frequency Identification) signals. This permits, for example, to identify and/or authenticate an operator who is carrying a RFID chip. Advantageously, the other functions of the operation unit provided laterally at the road finishing machine will only be enabled for use upon authentication by an RFID chip to prevent unauthorized access.

As an alternative or in addition to the possibility of wireless communication with the road finishing machine, the interface may comprise a terminal element, for example a USB port, which permits electronic data exchange with a unit that may be plugged into it, for example a USB flash drive, a notebook or a special data reader. However, communication with such a unit could also be performed wirelessly.

Advantageously, the interface may be used for reading out operational data of the road finishing machine. These read-out operational data could then be used, for example, for planning or managing the construction site. It is also conceivable to transmit operational data to the road finishing machine via the interface. For example, setting parameters of the working components of the road finishing machine that may be later selected by a user may be transmitted to the road finishing machine. Moreover, a diagnosis of functions of the road finishing machine via an external unit, in particular a notebook, may be possible via the interface.

To be able to more easily transport the road finishing machine to a new construction site, it may be transferred into a loading state in which it is compact. To this end, a roof of the road finishing machine may be, for example, folded down, the screed may be lowered, and/or a spreading auger of the road finishing machine may be brought to a suited height position, in particular an upper height position. If the screed is an extendable screed with variable width, it may be retracted when the road finishing machine is transferred to its loading state. When the road finishing machine is transferred to its loading state, the material bunker may also be transferred to a compact state, for example by folding it up. When the material bunker is in the compact state, it can be checked, when the road finishing machine is being transferred to its loading state, whether a locking of the material bunker in its compact state is activated, for example by a bunker wall locking mechanism. If necessary, it may be activated. The transfer of the road finishing machine to the loading state may be effected partially or completely automatically. Advantageously, for this the plurality of secondary operational controls of the operation unit provided laterally at the road finishing machine comprises an operational loading mode control which may be actuated for automatically transferring the road finishing machine to the loading state. A sequence for automatically transferring the road finishing machine to the loading state may thus be easily initiated by a user standing next to the road finishing machine.

After the transport to a construction site in the loading state, the road finishing machine may be transferred into an unloading state before the laying of a roadway pavement may be started. For this, the roof of the road finishing machine may be folded up again, the screed lifted upwards and/or the spreading auger brought into a lower height position. If the screed is an extendable screed with variable width, it may be at least partially extended when the road finishing machine is transferred to its unloading state. When the road finishing machine is brought into the unloading state, the material bunker may also be transferred to a state where it is ready for receiving paving material. The transfer of the road finishing machine to the unloading state may also be effected partially or completely automatically. Advantageously, for this the plurality of secondary operational controls of the operation unit provided laterally at the road finishing machine may comprise an operational unloading mode control which may be actuated for automatically transferring the road finishing machine to the unloading state. A sequence for automatically transferring the road finishing machine to the unloading state may thus be easily initiated by a user standing next to the road finishing machine. It is, however, particularly advantageous if, for the transfer to the unloading state, no separate secondary operational control is provided, but an actuation of the operational loading mode control triggers an automatic transfer of the road finishing machine to the unloading state when the road finishing machine is already in its loading state when the operational loading mode control is actuated.

Advantageously, the automatic transfer of the road finishing machine to the loading state or unloading state is even possible when the primary power plant (e.g., diesel engine) of the road finishing machine is deactivated. In this case, the corresponding functions may be performed by means of electric energy from an energy storage, in particular from a battery. It is also conceivable that other functions supported by secondary operational controls, for example switching on a lighting, are possible with the primary power plant being deactivated.

The plurality of secondary operational controls may comprise, in addition or as an alternative, an operational TI (Traction Isolation) control, in particular a TI switch, which may be actuated for prohibiting a driving function of the road finishing machine. The operational TI control may be actuated for restoring the driving function after an actuation for prohibiting the driving function of the road finishing machine. The integration of an operational TI control into the operation unit provided laterally at the road finishing machine is particularly efficient with respect to the manufacture of the road finishing machine. For example, cable routings leading to the operation unit may be used for connecting the operational TI control and for the at least one other secondary operational control.

The secondary operational controls may be connected with a control system of the road finishing machine which is configured for providing the corresponding functions of the secondary operational controls.

The operation unit may comprise a port for loading accumulator-driven external devices, so that these may be loaded at the road finishing machine.

Optionally, a tread device with a tread may be provided at the chassis which provides a stand at the operation unit laterally provided at the road finishing machine for a person who actuates the secondary operational controls.

Below, example embodiments of the disclosure will be illustrated more in detail with reference to the accompanying drawings.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
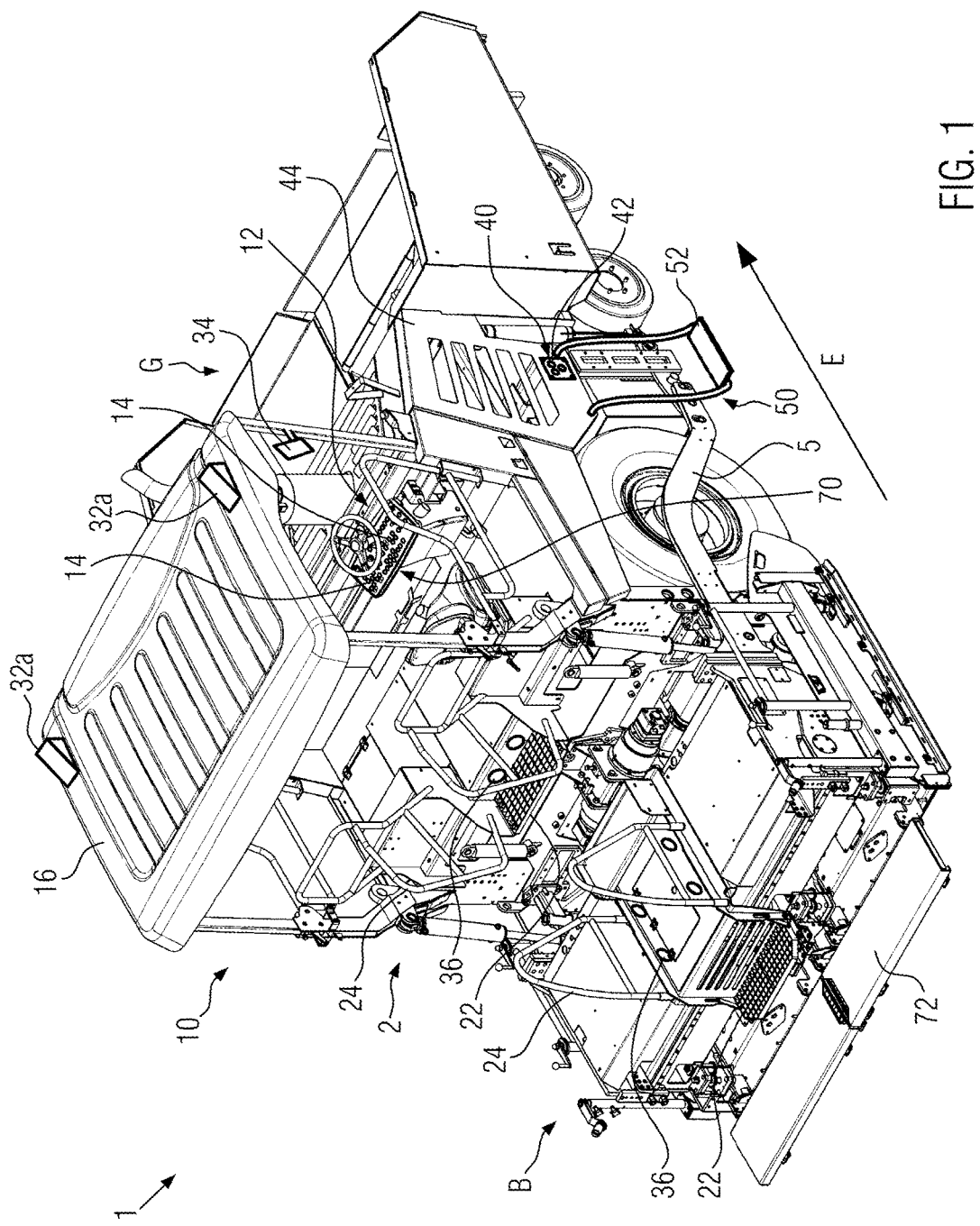
FIG. 1 shows a schematic representation of a road finishing machine according to an embodiment with an operation unit provided at a side covering of the road finishing machine.
Figure 2:
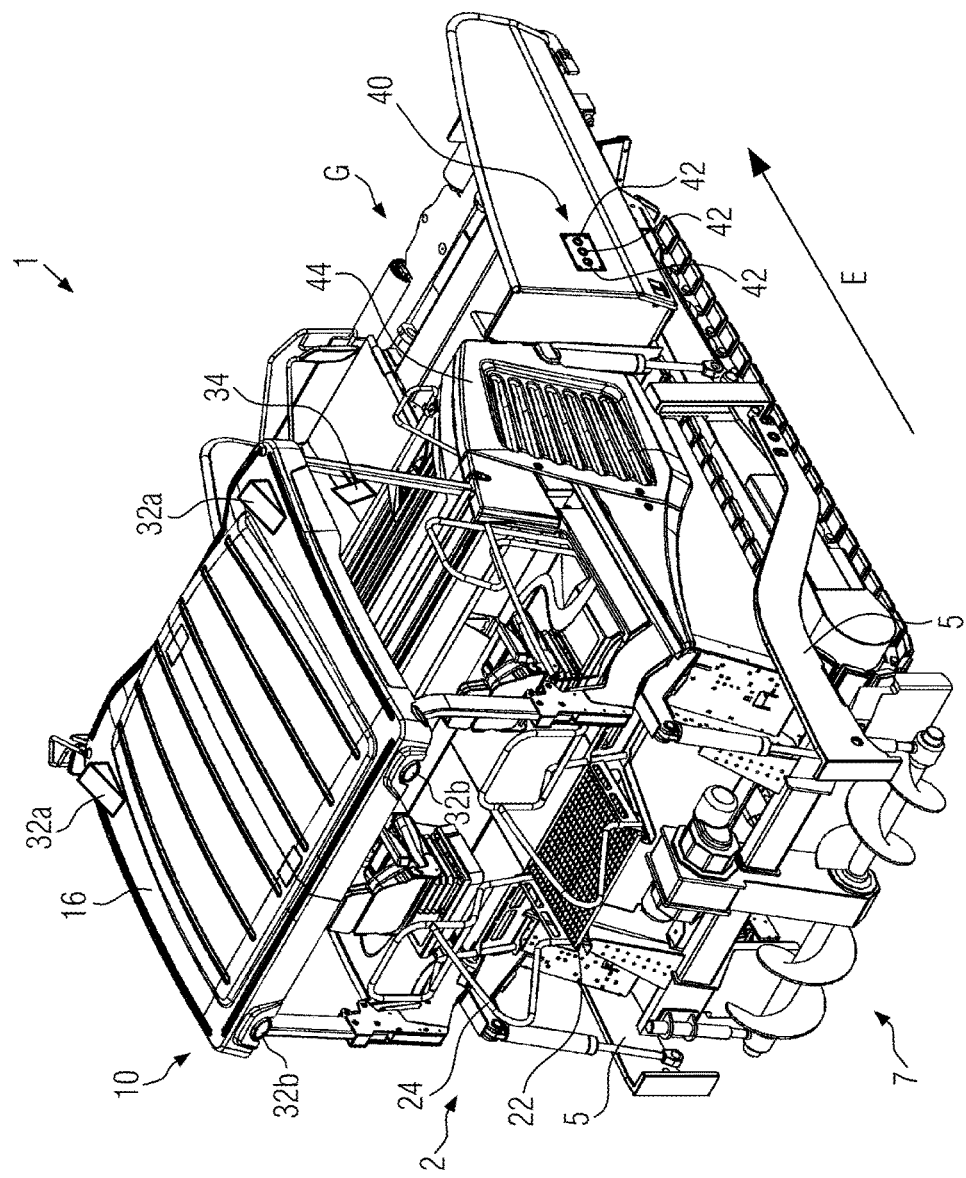
FIG. 2 shows a schematic representation of a road finishing machine according to an embodiment with an operation unit attached laterally at the material bunker, wherein the screed is not represented to give a better overview.

FIGS. 1 and 2 each show an embodiment of a road finishing machine 1 according to the disclosure. In the paving direction E in the front, one material bunker G each is provided for receiving paving material. With respect to the paving direction E at the rear, a screed B is provided for compacting the paving material. The screed B is preferably towed behind the chassis 2 with tow bars 5 articulated at a chassis 2 of the road finishing machine 1. During a paving operation, the paving material is brought from the material bunker G against the paving direction E via suited conveyor means, for example a scraper belt, to a rear side of the road finishing machine 1, where it is distributed transversely to the paving direction E preferably by means of a spreading auger 7 and is supplied in front of the screed B. In FIG. 2, the screed B is not represented, so that the spreading auger 7 becomes visible.

On the chassis 2 of the road finishing machine 1, a driver stand 10 is provided which comprises a working place for an operator of the road finishing machine 1. For controlling working components of the road finishing machine 1, for example the screed B, the spreading auger 7 or the scraper belt, a main control platform 12 with primary operational controls 14 is provided on the driver stand 10 (not represented in FIG. 2). The primary operational controls 14 may be actuated by an operator located on the road finishing machine 1. The driver stand 10 may comprise a roof 16 for protecting the operator from weather influences or falling objects. In the shown embodiments, access to the driver stand 10 is possible from behind via the screed B. To this end, devices facilitating the access, in particular tread grids 22 and railings 24, are provided.

The road finishing machine 1 may comprise a lighting 32, 34, 36 including several lighting elements. The lighting may in particular comprise a work lighting 32 for illuminating the surrounding area of the road finishing machine 1 which may in particular include headlamps 32a and/or tail lamps 32b (see FIG. 2). Moreover, a driver stand lighting 34 may be provided for illuminating the driver stand 10. To facilitate access to the driver stand 10 in darkness, an access area to the driver stand 10 may be illuminated by means of an access lighting 36. This may be, for example, lamps embedded in the access area.

According to the disclosure, an operation unit 40 with a plurality of secondary operational controls 42 is provided laterally at the chassis 2 or the material bunker B. The secondary operational controls 42 may be operated by an operator standing next to the road finishing machine 1. In the embodiment shown in FIG. 1, the operation unit 40 is provided laterally at the chassis 2. It is in principle conceivable to attach the operation unit 40 directly at the chassis 2. In the shown embodiment, the operation unit 40 is, however, attached to a side covering 44 and provided laterally at the chassis 2 via this covering. In the embodiment shown in FIG. 2, the operation unit 40 is provided laterally at the material bunker G.

In the embodiment shown in FIG. 1, a tread device 50 with a tread 52 is provided at the chassis 2 which provides a stand for an operator for operating the secondary operational controls 42. Such a tread device 50 may be used to drive along with the road finishing machine 1 during the operation of the secondary operational controls 42 during a paving drive. For some applications, however, such a tread device 50 may prove to be disturbing and may be omitted.

Figure 3:
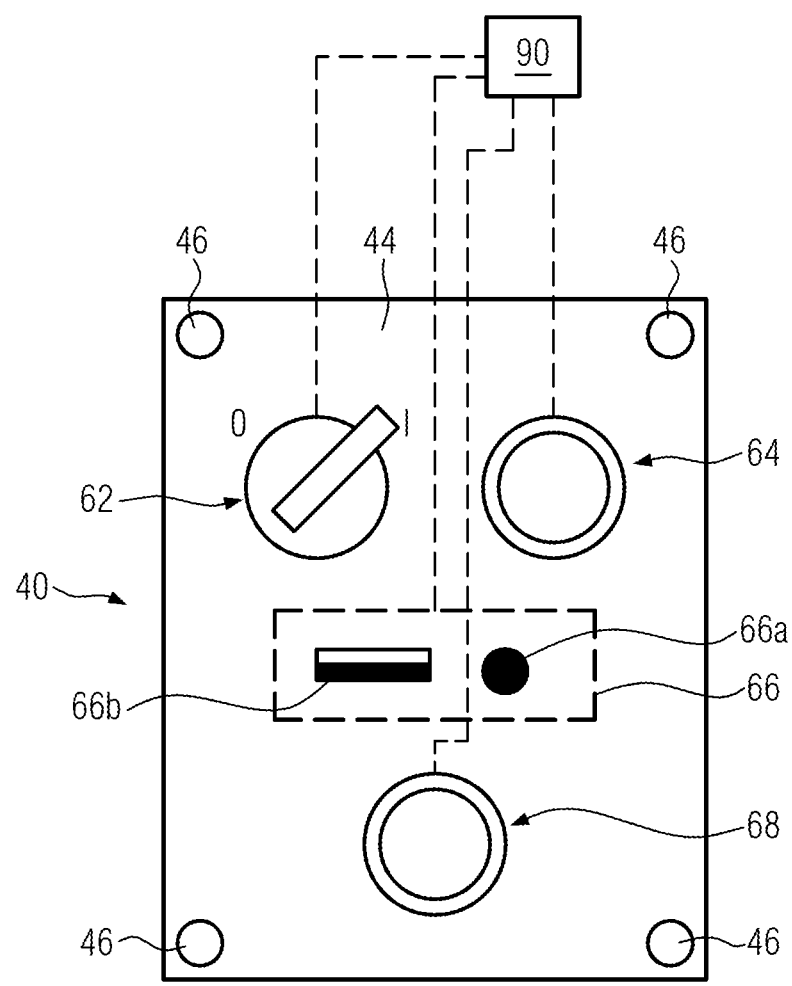
FIG. 3 shows a schematic plan view of an operation unit of a road finishing machine according to an embodiment.

In FIG. 3, a possible embodiment of the operation unit 40 with several secondary operational controls 42 is represented more in detail. The operation unit 40 may comprise a screen 44 that is attached to the road finishing machine 1 and accommodates the secondary operational controls 42. In particular, the screen 44 may comprise fastening features 46, such as screw holes, for fastening the operation unit 40 to the road finishing machine 1. In the shown embodiment, the plurality of secondary operational controls 42 of the operation unit 40 comprises an operational TI control 62, an operational lighting control 64, an interface 66 for data exchange with the road finishing machine 1, and an operational transport mode control 68. However, one or several ones of the secondary operational controls 42 may be omitted or replaced by other secondary operational controls 42, as long as at least two secondary operational controls 42 are present. The addition of further secondary operational controls 42 is also conceivable.

The secondary operational controls 42 may be connected to a control system 90 of the road finishing machine 1 schematically shown in FIG. 3 which is configured to provide corresponding functions of the secondary operational controls 42.

The operational TI control 62 is embodied, in the shown embodiment, as rotary switch actuated between two operating positions. If a person wishes to perform works in a region in front of the road finishing machine 1, she or he may prohibit the driving function of the road finishing machine 1 by means of the operational TI control 62 (for example by bringing the rotary switch to an active position ("I"). Independent of other user inputs, for example user inputs made on the driver stand 10, the road finishing machine 1 will then be stopped and may no longer continue driving until the operational TI control 62 is actuated again for restoring the driving function of the road finishing machine 1, for example by turning the rotary switch back to the deactivated position ("O").

The operational lighting control 64 is, in the shown embodiment, designed as a pushbutton and may be actuated for switching on or off at least a first part of the lighting 32, 34, 36 of the road finishing machine 1. When the first part of the lighting 32, 34, 36 is switched off, the actuation of the operational lighting control 64 may switch it on. When the first part of the lighting 32, 34, 36 is switched on, an actuation of the operational lighting control 64 may switch it off. For example, when the operational lighting control 64 is being actuated, the working lighting 32, the driver stand lighting 34, and/or the access lighting 36 of the road finishing machine 1 may be switched on or off. The road finishing machine may comprise a configuration device 70 which permits to control which lighting elements are to be switched on and off by the operational lighting control 64. The configuration device 70 may be provided, for example, at the main control platform 12 on the driver stand 10, since the configuration of the operational lighting control 64 normally does not have to be changed very often. However, it would also be conceivable to also provide the configuration device 70 at the operating unit 40 laterally provided at the road finishing machine 1 so it is easier to access.

The shown interface 66 for data exchange with the road finishing machine 1 comprises a transmitter and/or receiver 66a permitting wireless communication with the road finishing machine 1. The wireless communication may in particular be accomplished via NFC or Bluetooth. One possible application is to read out a signal of an RFID chip by a receiver 66a and to thus authenticate a user, and to only then enable the other functions of the operation unit 40. The shown interface 66 moreover comprises a terminal element 66b, in the shown embodiment a USB port, which permits electronic data exchange between the road finishing machine 1 and a unit that may be plugged into the terminal element 66b. This functionality may be used, for example, for reading out operational data from the road finishing machine 1 or for connecting a unit for a diagnosis of functions of the road finishing machine 1. It would also be possible for the interface 66 to only comprise either the transmitter and/or the receiver 66a or the terminal element 66b, or for further transmitters and/or receivers 66a and/or terminal elements 66b to be provided.

The terminal element 66b may be advantageously also used as a port for loading accumulator-driven external devices. However, it would also be conceivable for the operation unit 40 to comprise a separate port for loading accumulator-driven external devices. Here, the special type of port may be selected depending on the demand.

The operational loading mode control 68 may be actuated to automatically transfer the road finishing machine 1 to a loading state. For this, upon actuation of the operational loading mode control 68, for example, the roof 16 of the road finishing machine 1 may be folded down or up. As an alternative or in addition, the screed B may be lowered. As an alternative or in addition, upon actuation of the operational loading mode control 68, a height position of the spreading auger 7 of the road finishing machine 1 may be changed. In particular, the spreading auger 7 may be driven to an upper position.

Advantageously, the operational loading mode control 68 is configured such that it is actuated for automatically transferring the road finishing machine 1 to an unloading state when the road finishing machine 1 is already in its loading state. Thus, the road finishing machine 1 may be quickly and easily made operable after it has been transported to a new site.

As one skilled in the art would understand, the main control platform 12, operation unit 40 and control system 90 may individually, collectively, or in any combination comprise suitable hardware and software, such as one or more processors (e.g., one or more microprocessors, microcontrollers and/or programmable digital signal processors) in communication with, or configured to communicate with, one or more storage devices or media including computer readable program instructions that are executable by the one or more processors so that the main control platform 12, operation unit 40 and control system 90 may perform particular algorithms represented by the functions and/or operations described herein. The main control platform 12, operation unit 40 and control system 90 may individually, collectively, or in any combination also, or instead, include one or more application specific integrated circuits, programmable gate arrays or programmable array logic, programmable logic devices, or digital signal processors.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the invention.

What is claimed is:

1. A road finishing machine comprising:
   a chassis;
   a material bunker for receiving paving material located at a front in a paving direction of the road finishing machine;
   a screed for compacting paving material located at a rear in the paving direction of the road finishing machine;

a main control platform arranged on a driver stand of the road finishing machine with primary operational controls for controlling working components of the road finishing machine, wherein the primary operational controls may be operated by an operator located on the road finishing machine;

an operation unit with a plurality of secondary operational controls provided laterally at the chassis or the material bunker; and a lighting comprising a working lighting for illuminating surrounding area of the road finishing machine, a driver stand lighting for illuminating the driver stand, and/or an access lighting for illuminating an access area to the driver stand;

wherein the plurality of secondary operational controls comprises an operational lighting control which may be actuated for switching on and for switching off at least part of the lighting, and wherein the at least part of the lighting is configured to go out after lapse of a predetermined period of time after the actuation of the operational lighting control for switching off the at least part of the lighting, and wherein when the at least part of the lighting is switched off, an actuation of the operational lighting control switches on the at least part of the lighting, and when the at least part of the lighting is switched on, an actuation of the operational lighting control switches off the at least part of the lighting.

2. The road finishing machine according to claim 1 wherein the predetermined period of time is adjustable.

3. The road finishing machine according to claim 1 wherein the lighting comprises several lighting elements, and a configuration device is provided which permits to control which lighting elements may be switched on and/or switched off by actuating the operational lighting control.

4. The road finishing machine according to claim 1 wherein the plurality of secondary operational controls comprises an interface for electronic data exchange with the road finishing machine.

5. The road finishing machine according to claim 4 wherein the interface is configured for data exchange with the road finishing machine by wireless communication.

6. The road finishing machine according to claim 5 wherein the interface is configured for data exchange with the road finishing machine based on RFID, NFC or Bluetooth.

7. The road finishing machine according to claim 4 wherein the interface comprises a terminal element which permits electronic data exchange with a unit that may be plugged into it.

8. The road finishing machine according to claim 4 wherein the interface may be used for reading out operational data of the road finishing machine, for transmitting operational data to the road finishing machine, for performing a diagnosis of functions of the road finishing machine, or for transmitting user-specific data to the road finishing machine.

9. The road finishing machine according to claim 4 wherein the interface may be used for transmitting user-specific data to the road finishing machine for authenticating a user.

10. The road finishing machine according to claim 1 wherein the plurality of secondary operational controls comprises an operational loading mode control which may be actuated for automatically transferring the road finishing machine into a loading state.

11. The road finishing machine according to claim 10 wherein the automatic transferring of the road finishing machine into the loading state comprises folding down a roof of the road finishing machine, lowering the screed, changing height position of a spreading auger of the road finishing machine, and/or checking whether a bunker wall locking mechanism is activated, and if necessary activating the bunker wall locking mechanism.

12. The road finishing machine according to claim 10 wherein the operational loading mode control may be actuated for automatically transferring the road finishing machine into an unloading state when the road finishing machine is in its loading state.

13. The road finishing machine according to claim 1 wherein the plurality of secondary operational controls comprises an operational traction isolation control which may be actuated for prohibiting a driving function of the road finishing machine.

14. The road finishing machine according to claim 13 wherein the operational traction isolation control may be actuated, after an actuation for prohibiting the driving function of the road finishing machine, for restoring the driving function of the road finishing machine.

15. The road finishing machine according to claim 1 wherein the secondary operational controls are arranged such that they may be operated by an operator standing next to the road finishing machine.

16. The road finishing machine according to claim 1 wherein the operation unit comprises a port for loading accumulator-driven external devices.

17. The road finishing machine according to claim 1 wherein a tread device with a tread is provided at the chassis which provides a stand for an operator for operating the secondary operational controls.

18. A road finishing machine comprising:
a chassis;
a material bunker for receiving paving material;
a screed for compacting paving material;
a driver stand on the chassis;
a main control platform arranged on the driver stand, the main control platform including primary operational controls for controlling working components of the road finishing machine, wherein the primary operational controls may be operated by an operator located on the driver stand;
an operation unit with a plurality of secondary operational controls provided laterally at the chassis or the material bunker; and
a tread device provided at the chassis, the tread device having a tread which provides a stand for an operator for driving along with the road finishing machine while operating the secondary operational controls during a paving drive.

19. The road finishing machine according to claim 18 further comprising a lighting, wherein the plurality of secondary operational controls comprises an operational lighting control which may be actuated for switching on and for switching off at least part of the lighting.

20. The road finishing machine according to claim 19 wherein the lighting comprises a working lighting for illuminating surrounding area of the road finishing machine, a driver stand lighting for illuminating the driver stand, and/or an access lighting for illuminating an access area to the driver stand, wherein the at least part of the lighting is configured to go out after lapse of a predetermined period of time after the actuation of the operational lighting control for switching off the at least part of the lighting.

* * * * *